United States Patent [19]
Gatliff

[11] Patent Number: 5,829,192
[45] Date of Patent: Nov. 3, 1998

[54] METHOD FOR FOCUSING THE GROWTH OF A VEGETATIVE ROOT SYSTEM TO TARGET A CONTAMINATED AREA

[76] Inventor: Edward G. Gatliff, 7355 Dixon Dr., Hamilton, Ohio 45011

[21] Appl. No.: 771,964

[22] Filed: Dec. 23, 1996

[51] Int. Cl.$^6$ .............................. A01B 79/00; A01C 1/00; A01G 9/02; A01G 23/04; A01G 17/00; A47G 7/02; A47G 33/12; C21B 9/00; C22B 9/00; E04B 1/00; E04G 21/00; E04G 23/00

[52] U.S. Cl. ........................ 47/58; 47/25; 47/42; 47/40.5; 47/76; 47/83; 75/710; 52/745.14

[58] Field of Search .................................. 47/58, 76, 83, 47/40.5, 42, 25, DIG. 3; 75/710; 52/745.14, 741.3, 578, 102, 71, 741.11

[56] References Cited

U.S. PATENT DOCUMENTS

| | | | |
|---|---|---|---|
| 5,442,891 | 8/1995 | Albrecht | 52/745.14 |
| 5,476,142 | 12/1995 | Kajita | 166/294 |

OTHER PUBLICATIONS

Schnoor et al.; Phytoremediation of Organic and Nutrient Contaminant, Environmental Science & Technology, vol. 29, No. 7, 1995, 318–323.

Strand et al.; Removal of Trichloroethylene From Aquifers Using Trees; Innovative Technol. Site Rem. Hazard. Waste Manage., Proc. Natl. Conf.; 1995, 605–612 (Abstract Only).

Kirkman; Basic Gardening Illustrated; 1975, 1–128 (Only paper 20, 25, 48–53, & 122).

*Primary Examiner*—Douglas W. Robinson
*Assistant Examiner*—Kent L. Bell
*Attorney, Agent, or Firm*—Lerner, David, Littenberg, Krumholz & Mentlik

[57] ABSTRACT

Root growth and development of vegetation used to remediate contaminated soil and/or groundwater is directed to targeted zones by a casing lining the hole in which the vegetation is planted. A flexible, self-sealing casing encourages strong and healthy root development of the root system deep in the soil horizons, resulting in an increase in the remedial capacity of the vegetation through the preferential development in or near the zone of soil or groundwater contamination.

23 Claims, 5 Drawing Sheets

METHOD FOR FOCUSING THE GROWTH OF A VEGETATIVE ROOT SYSTEM TO TARGET A CONTAMINATED AREA

BACKGROUND OF THE INVENTION

The present invention is directed to phytoremediation, and more specifically to facilitating the directed growth of a tree root system to result in more effective phytoremediation.

The preservation and protection of the environment are among the most paramount social and economic issues affecting our society today. In instances where soil and/or groundwater have been contaminated by industry, the assessment of the contamination must be swiftly implemented, and the remediation of the assessed contamination must be effective and inexpensive as possible.

During an assessment phase, the contaminant in the soil or groundwater is identified. Typical contaminants of soil and groundwater include nitrates, heavy metals, and other inorganic and organic compositions. The extent of contamination by any of these or other contaminants is then ascertained. At that point, remediation approaches must be investigated, and an appropriate methodology or methodologies is selected. Typical remediation methods include the removal and disposal of the contaminated soil; sparging (i.e., forcing oxygen into water and/or soil to enhance microbial activity); and pump and treat techniques whereby contaminated groundwater is pumped and treated out of the ground.

In addition to the above techniques, bioremediation techniques, i.e., techniques which take advantage of natural biological processes, are becoming more popular as the primary or secondary methodology for the clean up of contaminants. Bioremediation techniques include the use of microorganisms to metabolize or otherwise chemically transform hazardous or toxic substances; but also include the use of plants to absorb and metabolize or otherwise degrade contaminants through the natural processes which take place during the life of various plants. The use of plants for environmental remediation is referred to as phytoremediation and may also be referred to as vegetative remediation. Phytoremediation is emerging as a preferred technique for remediating many contaminated sites, because it is a cost effective measure, and it is often less invasive to the contaminated real estate than other measures.

The concept underlying phytoremediation is to allow vegetation to extract contaminants from the soil and/or groundwater, and/or introduce via the root system microbes, nutrients, substrates, water and oxygen to enhance other biological processes, thereby "cleansing" the soil and/or groundwater. The vegetation and/or its associated processes might then dissipate the contaminant in a non-harmful manner, thereby cleansing itself, or, depending upon the vegetation and the contaminant, the vegetation might need to be removed and destroyed or otherwise disposed of. Different plant species will effect the cleansing in different ways. For instance, some species will extract the contaminants and assimilate the same within its root, branch and leaf systems, while other species will extract the contaminant and chemically decompose the same through the natural biochemical processes inherent in that species.

Phytoremediation has grown beyond simply planting vegetation in contaminated areas. Overall strategies, including a determination of what plant species to employ, are developed and implemented based on the contamination site, its location, the types of contaminants to be cleaned up, etc. One technique which has been employed when actually planting the vegetation has been to alternately run an auger into the ground and place a hard pipe, for instance PVC piping, into the hole in the ground. The hard pipe was inserted to the point where the unsaturated layer (the vadose zone) meets the saturated layer (the capillary fringe). In employing this technique, the holes were about thirty-six (36) inches in diameter and as deep as twelve (12) feet. The hard pipes used in this technique have been from four (4) to twelve (12) feet long. The object of the hard casing was to encourage root growth in the vertical direction and prevent the more natural horizontal root growth near the surface since there may be less or no contamination at the near surface level. However, the use of hard casings is expensive at remediation sites which include many trees. Also, perhaps more importantly, surface water migrates vertically along the hard casing to deeper levels. This affects the root growth in that the deeper root system would be less apt to develop to seek water and nutrients at a deeper level in order to meet its needs for growth, and instead would feed on the migrating surface water. In addition, the migration of large volumes of surface water can preferentially fill the void space in the hole created by the auger which in certain cases can lead to the drowning of the tree roots. This could kill or seriously harm the tree, rendering the remedial process ineffective. The above, in turn, would adversely affect the ability and efficiency of the root system to extract contaminated soil and/or groundwater, and lessen the remedial effect of the vegetation.

The present invention addresses the efficiency and cost effectiveness of phytoremediation in general, and presents specific techniques to facilitate remediation of particular targeted areas. Along the way, together with the unique techniques added to phytoremediation, the above shortcomings of the above-discussed particular technique are overcome. The present invention elevates phytoremediation to its next level of growth in becoming one of the preferred primary or supplemental methods for remediation.

SUMMARY OF THE INVENTION

One aspect of the present invention relates to a method of planting and/or growing a tree, as well as the resulting tree itself, which will facilitate remediation of a contaminated aquifer layer. Here, a hole is prepared such that the root system of a tree planted therein will grow substantially downward towards a contaminated aquifer such that the roots will be fed by the water in the aquifer layer and will accordingly extract contaminants from the contaminated aquifer layer. A casing made of a hard or flexible material, a combination of both or casings of both can be provided as part of the prepared hole to facilitate such root growth.

Another aspect of the present invention relates to a method of planting and/or growing a tree, as well as the resulting tree itself, such that the remediation of contaminated soil and/or groundwater can be facilitated at any layer of the earth. This aspect of the present invention contemplates the use of a flexible self-sealing casing which is substantially impervious to water and nutrients for root growth and extends to the layer of earth to be remediated. The flexible self-sealing casing seals the junction between the earth outside of the prepared hole and the earth inside of the prepared hole, while at the same time preventing root growth outside of the prepared hole.

A further aspect of the present invention relates to a method of planting and/or growing a tree, as well as the resulting tree itself, for facilitating the remediation of contaminated soil and/or groundwater not only at the bottom of a prepared hole, but also at other levels above the bottom of the prepared hole. This aspect of the present invention contemplates the use of openings within a casing, whether it be a hard, flexible or combination casing. At least one opening is required for this aspect of the present invention, but typically more than one opening will be provided. Also, the opening might be covered by a material which will, over time, permit root growth through the opening. The amount of time the roots are to be prevented from growing through the opening will dictate the type of material which will be used to temporarily cover the opening in this latter embodiment.

It is an object of the present invention to provide a method for planting and/or growing a tree, as well as the resulting tree itself, for facilitating the remediation in various targeted areas of the earth.

It is another object of the present invention to provide a method of planting and/or growing a tree, as well as the resulting tree itself, which will facilitate remediation in an efficient and cost effective manner.

The above and other objects in the present invention can be realized by creating a hole in the earth such that the hole reaches the contaminated aquifer layer, at least partially filling the hole with a rooting medium, preparing the hole with such a structure that new root growth would be influenced substantially downward towards the contaminated aquifer layer, and planting a tree in the prepared hole. A preferred but not necessary structure is a casing of a material which is substantially imporous to water and nutrients for root growth. This casing lines the walls of the hole so that root growth is inhibited from growing outside of the prepared hole. The casing can be a substantially rigid casing, a substantially flexible casing or any other suitable type of casing, including a combination of rigid and flexible materials. Such a method facilitates remediation of a contaminated aquifer as the root system will feed on the contaminated water in that contaminated aquifer.

The objects and advantages of the present invention can also be realized by creating a hole in the earth that reaches the contaminated soil and/or ground water to be remediated. In this embodiment, the hole may not reach a contaminated aquifer layer or any aquifer layer. It reaches the layer to be remediated. The walls of the hole are lined with a flexible self-sealing casing which is substantially impervious to water and nutrients, and will facilitate the creation of the seal at the junction between the walls of the hole and the self-sealing casing, or between the earth on the outside of the wall and the earth in the inside of the wall.

This latter embodiment can be practiced by providing the flexible, self-sealing casing in the hole alone or together with a substantially rigid casing, which rigid casing can be removed to leave the flexible self-sealing casing within the hole. An additive can be provided to the walls or portions thereof to facilitate the creation of the seal at said junction.

The above and other advantages and objects of the present invention can also be realized by creating a hole in the earth which reaches the contaminated soil and/or groundwater, lining the walls of the hole with a casing made of a material which is substantially impervious to water and nutrients required for root growth, whereby the casing has a first end, a second end, and at least one opening between the first and second ends. A tree is implanted within the hole, and root growth is directed substantially downward except that root growth will also be permitted through at least one opening in the casing. Root growth may be permitted through such an opening immediately or after a period of time during which time the opening would be covered with a material to temporarily prevent root growth through the opening.

BRIEF DESCRIPTION OF THE DRAWINGS

The above and other objects and advantages of the present invention will become apparent, as will a better understanding of the concepts underlying the present invention, by reference to the description which follows and refers to the accompanying drawings in which.

DETAILED DESCRIPTION OF THE INVENTION

The present invention concerns the planting of vegetation for the purpose of facilitating the remediation of contaminated soil or groundwater. (The terms "vegetation" and "trees" are used interchangeably to refer to any plant, plant species, cutting or the like which may be suitable for use in connection with the remediation of contaminated soil or groundwater. The term "soil" as used herein shall refer to any soil media including medias made up of gravel, sand and/or soil or other soil-like material.)

In connection with the present invention, a hole (typically many holes) must be created in the earth in the contaminated area in order to plant the appropriate vegetation. This may be accomplished in any suitable manner, but is most often accomplished by augering (i.e., drilling) a cylindrical hole which is vertical or substantially vertical (though it can be at any angle).

Figure 1:
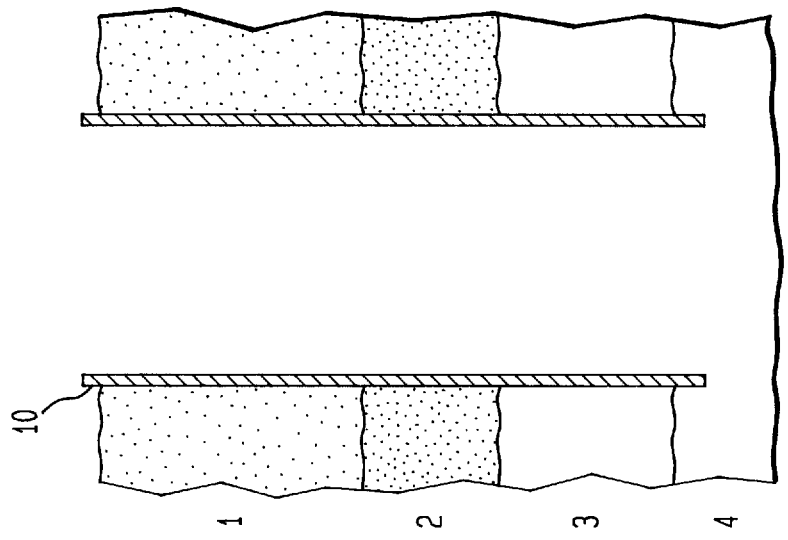
FIG. 1 is a schematic representation of a cross-section of earth in which a hard casing has been inserted into a hole constructed to target a contaminated deeper aquifer zone.

In one aspect of the present invention, as shown in FIG. 1, a hole, preferably a cylindrical hole, is drilled through the various layers of earth to reach a contaminated aquifer of soil. By way of example, in FIG. 1, these layers include the vadose layer 1, the capillary fringe layer 2, the upper aquifer layer 3 and the lower aquifer layer 4. For the purposes of this application, the vadose layer 1 is typically made up of unsaturated soil and could be as deep as about 30 feet from the surface. The capillary fringe layer is typically made up of "field capacity" soil where only micropores are saturated, the water being drawn into the micropores and held by capillary action. The capillary fringe layer may reach a depth of about 40 feet. The upper aquifer layer 3 is typically a water saturated soil, typically uncontaminated groundwater, and it may reach a depth of greater than 60 feet. The deeper aquifer layer is also typically made up of a water saturated soil, and may reach a depth of greater than 100 feet. In this example, it is the deeper aquifer layer 4 which contains the contaminated groundwater.

Figure 3:
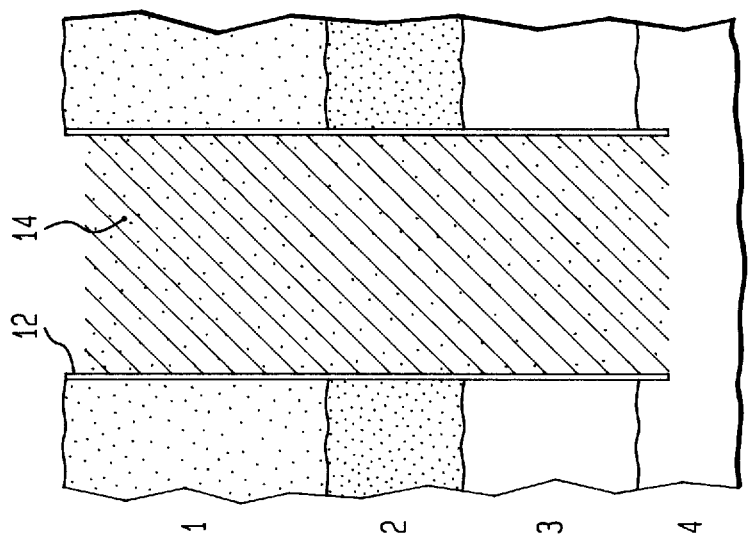
FIG. 3 is a schematic representation of the cross-section of earth shown in FIGS. 1 and 2, whereby the hard casing has been removed and the flexible casing remains to line and seal the hole.
Figure 2:
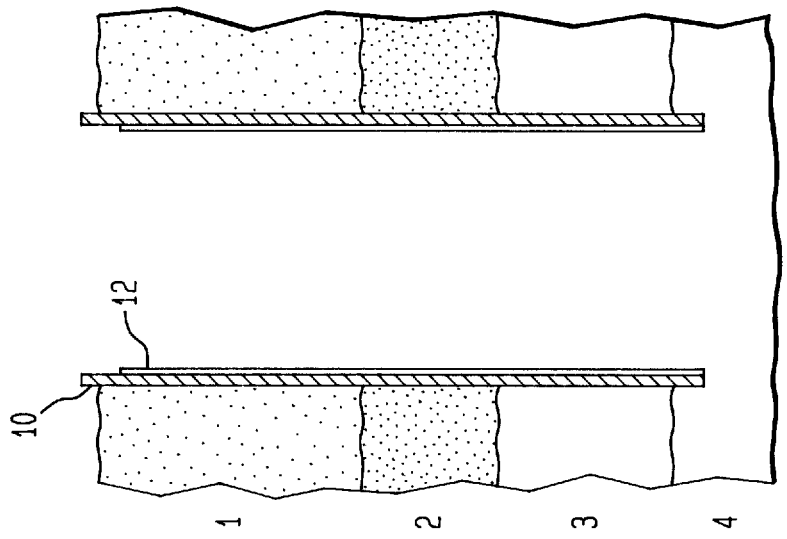
FIG. 2 is a schematic representation of the cross-section of earth shown in FIG. 1, illustrating the hole being lined with a flexible casing as well as the hard casing.

As can be seen in FIGS. 1–3, in the preferred embodiment, the illustrated hole at least reaches the contaminated aquifer, in this case the deeper aquifer zone 4. The hole is lined with a hard casing 10, which preferably possesses a degree of rigidity by which it has some stiffness independently of any other structures. It may be of any suitable or desirable shape or size. In constructing and lining the hole, a conventional drilling technique or any other suitable technique for creating a hole can be used. In this regard, the hole need not be vertical or even substantially vertical, though it is preferable that it is substantially vertical. Such a technique might include alternately augering the earth and pounding (or otherwise placing) the hard casing 10 into the augered hole.

Typically, the hard casing will be cylindrical in shape and will be approximately in the range of 12" to 18" in diameter. The hard casing 10 may be PVC or ABS piping, any other suitable commercially available piping or a casing made of any suitable material. The hard casing 10 maintains the structure of the augered hole during the planting process. It is recognized that the hard casing, while preferred, is optional since it is not required at all where the soil in which the hole is drilled is a tight soil such that the integrity of the hole will be maintained even without a hard casing.

In FIG. 2, the hole lined with the hard casing 10 is lined with a flexible casing 12. The flexible casing 12 is made of any suitable material which is flexible and is at least substantially impervious to water and nutrients. A preferred self-sealing, flexible casing is a medium to heavy gauge flexible plastic tubing which is of a diameter which matches or exceeds the diameter of the hole and, if used, the hard casing 10. The plastic tubing may typically be 3 to 10 mils (or more) in thickness, or any other suitable thickness given the circumstances. Such a pliable plastic material seals tightly to the outside soil as the lined hole is filled with soil, gravel or other fill material.

The flexibility of the material facilitates the self-sealing aspect of the present invention, which is discussed in more detail below with respect to FIGS. 5 and 6. The self-sealing quality of the flexible casing 10 inhibits the migration of water in the upper levels or surface of the ground to lower levels of soil. The result is that root growth into the deeper soil levels is more aggressive than it would be with a hard casing, and the roots at those deeper levels will develop more effectively to more efficiently absorb contaminants in the soil and/or groundwater. A pliable plastic material as discussed above seals tightly to the outside soil as the lined hole is filled with soil, gravel or other fill material. Also, it will be extremely difficult for roots to grow through.

The hole is now ready to be filled. The fill for the lined hole must include a good rooting medium for the tree. However, it may be desirable to put stones or pebbles at the bottom and/or at the top of the lined hole. Stones and/or pebbles have been used before at both the top and the bottom of a hole lined with a hard casing. At the top, the stones and/or pebbles will help insulate and limit high soil temperatures at the immediate soil surface during periods of intense sunlight. The stones and/or pebbles will also limit the sealing of the surface soil material to oxygen exchange by limiting rain water compaction and/or the severe drying associated with the high soil temperatures, thereby keeping soil pores open for gas exchange. At the bottom, stones and/or pebbles can help the water flow better, particularly where there is a tight material, i.e., it would allow free water to collect at the bottom of the hole.

Once the rooting medium and other fill are in the lined hole, the hard casing 10 can be removed, and the fill 14, as shown in FIG. 3, will force the flexible casing 12 against the various layers of ground surrounding the hole. Of course, more fill may be required after the hard casing 10 is removed.

In FIG. 3, the hard casing 10 has been removed, leaving only the flexible casing 12. This flexible casing 12 extends downwardly from the ground surface to the contaminated lower aquifer level 4, as did the hard casing 10. While the flexible casing 12 can be put in place together with the hard casing 10 or after the hard casing 10 is in place, with the hard casing 10 later being removed, other techniques can also be used to place the flexible casing 12 in the hole. One such technique is to use a hollow stem auger with a mud rotary drilling method which serves to keep the sides of the hole open when the auger is removed. To reach the desired depth, the flexible casing 12 is placed inside the hollow stem and the auger is pulled out, leaving the flexible casing 12 in place within the hole.

As illustrated in FIGS. 1–3, the hole and thus the lining reach the top portion of the contaminated lower aquifer 4. This top portion is the portion of the contaminated layer which is being targeted. One may wish to target a lower portion of a contaminated layer, and can do so with the present invention. What specific area is targeted will depend upon the strategy developed for remediating a particular site.

It is important to note that the hard casing 10 can be left in place and used in lieu of the flexible casing 12, while still targeting a contaminated aquifer layer. There are, however, advantages to using the flexible casing 12. One significant advantage is the self-sealing quality of the flexible casing 12. Another advantage is cost. A hard casing 10 costs more than a flexible casing 12, is more difficult and costly to transport to a site, etc. On a site being treated with hundreds of trees, using a hard casing instead of a flexible casing could increase costs substantially.

Figure 4:
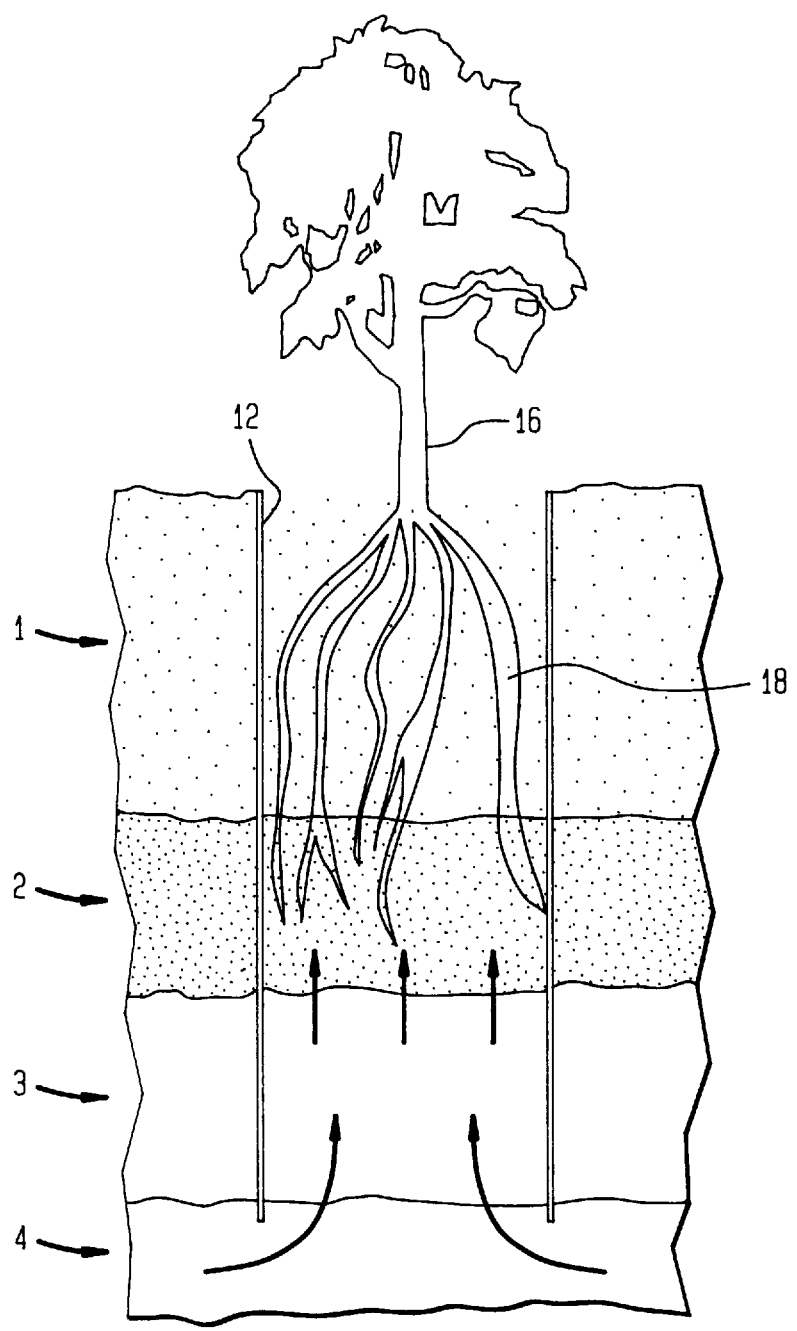
FIG. 4 is a schematic representation of a cross-section of earth in which a lined hole facilitates the control of the root growth of a tree to target the removal of contaminated water from the deeper aquifer zone.

Once the lined hole is fully prepared, a tree can be planted in the lined hole, and the roots of the planted tree will be encouraged to grow downward to seek groundwater and nutrients, since water and nutrients will be largely unavailable in the upper layers of the ground within the lined hole. FIG. 4 shows tree 16 planted in the hole lined with the flexible casing 12. In this case, the lined hole was filled entirely with a good rooting medium, and no pebbles or stones or any other fill was used. Also, FIG. 4 illustrates the filled hole after it has reached equilibrium. That is, the vadose layer and capillary fringe layer have developed naturally within the lined hole.

As can be seen in FIG. 4, the upper aquifer layer 3 outside of the hole, containing the uncontaminated groundwater, has been blocked from the hole, and thus from the root system of the tree 16. The flexible casing 12 prevents the uncontaminated groundwater from the upper aquifer layer 3 from entering the hole. Thus, it is the contaminated groundwater targeted in the lower aquifer layer 4 that feeds the root system. FIG. 4 shows the root system within the capillary fringe layer 2. There, the water seeping into the bottom of the lined and filled hole is drawn up into the capillary fringe by capillary action and into the root system. While FIG. 4 only shows the roots in the capillary fringe layer 2, it is possible that the root system will grow into the upper aquifer layer 3 or even into the lower aquifer layer 4 if the levels of oxygen in these layers are sufficient for such growth.

As discussed above, the flexible casing 12 is self-sealing. When a hole is dug and backfilled against a hard casing, a natural loosened vertical pathway of outer soil lies against the hard casing. Instead of near-surface and surface water being absorbed and percolated through the outer soil, it is likely to find the vertical pathway at the junction of the hard casing and outer soil, and migrate downward. Whether the casing extends into the vadose layer 1 only or extends into the lower aquifer layer 4, this vertical pathway is undesirable. When in the vadose layer 1, the root system may be fed by this migration surface water, and will be less likely to seek out water and nutrients at the deeper levels—i.e., those from the contaminated soil and groundwater. When in the lower aquifer layer 4, this vertical pathway creates a connection between surface water and groundwater. Thus, in the case of a spill or other contaminant at the surface, a contaminant can find its way to the groundwater via this vertical pathway and further contaminate the aquifer layer 4.

Figure 6:
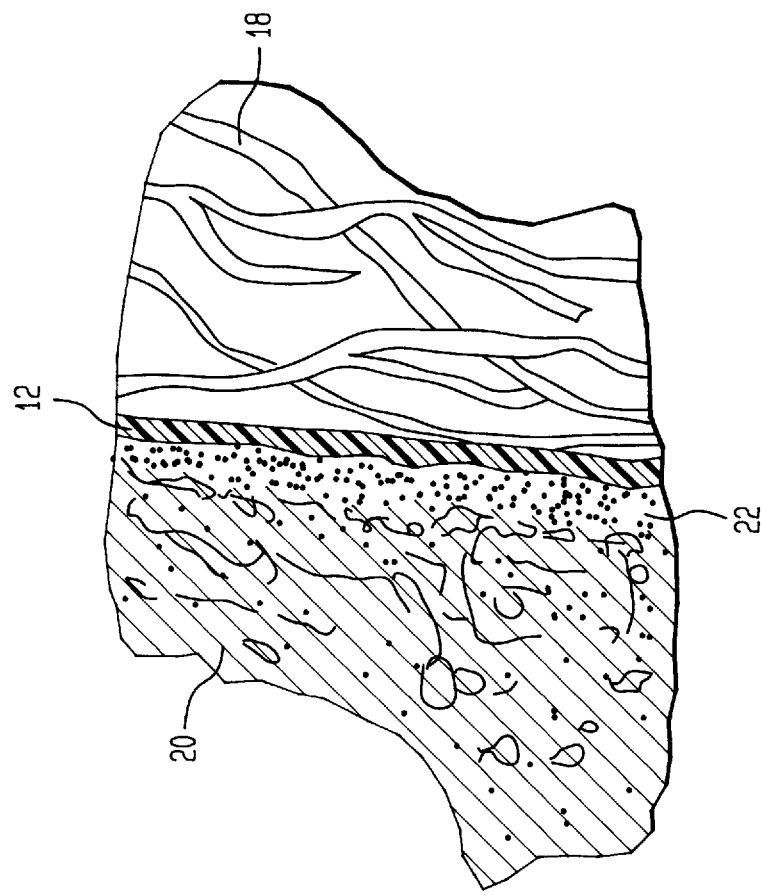
FIG. 6 is an enlarged cross-sectional view of a portion of a lined hole in which a root system is growing, illustrating the use of an additive to facilitate the seal between the flexible casing and the soil outside of the hole.
Figure 5:
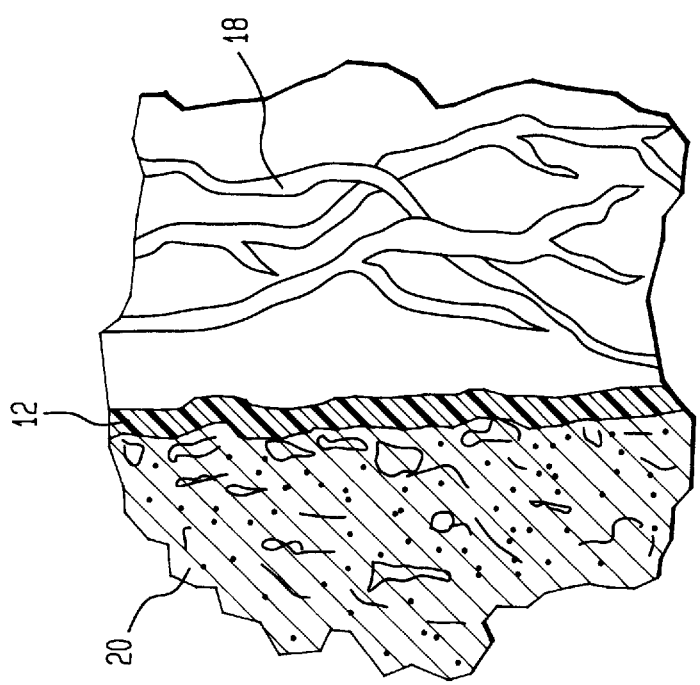
FIG. 5 is an enlarged cross-sectional view of a portion of a lined hole in which a root system is growing, illustrating the self-sealing of the flexible casing when backfilled with soil or another rooting medium.

As can be seen in FIG. 5, illustrating an enlarged view of a portion of a lined hole, the flexible casing 12 is forced against the irregular surface of the hole and fills any gaps so that it is tight against the outside soil (which is generally designated as 20 in FIGS. 5 and 6). The sealing effect is created when the lined hole is back-filled such that the fill forces the flexible casing 12 against the walls of the hole. The tight seal between the outside soil 20, the flexible casing 12 and the soil inside the hole inhibits, and in some cases prohibits, the migration of surface water or water in the upper levels of earth from migrating to lower levels of earth. Any such water would thus be unavailable to the roots 18, such that the roots 18 feed primarily on the contaminated groundwater in the lower aquifer level 4. Since the lower root system will not be feeding on water migrating from above, it will thus develop to utilize only the deep water having contaminants. The result is an increase in the efficacy of the plant in extracting contaminants from the contaminated layers.

In FIG. 6, the soil 20 is somewhat more coarse than a sandy or clay composition, and thus an additive 22 has been placed around the perimeter of the hole to facilitate the sealing of the flexible casing 12 to the outside soil. Such an additive might be a clay material or similar composition such as bentonite, dry concrete mix, or any other suitable material. The use of such an additive will depend upon the plasticity of the soil. The less the plasticity of the outer soil, the more an additive will be helpful.

Figure 7:
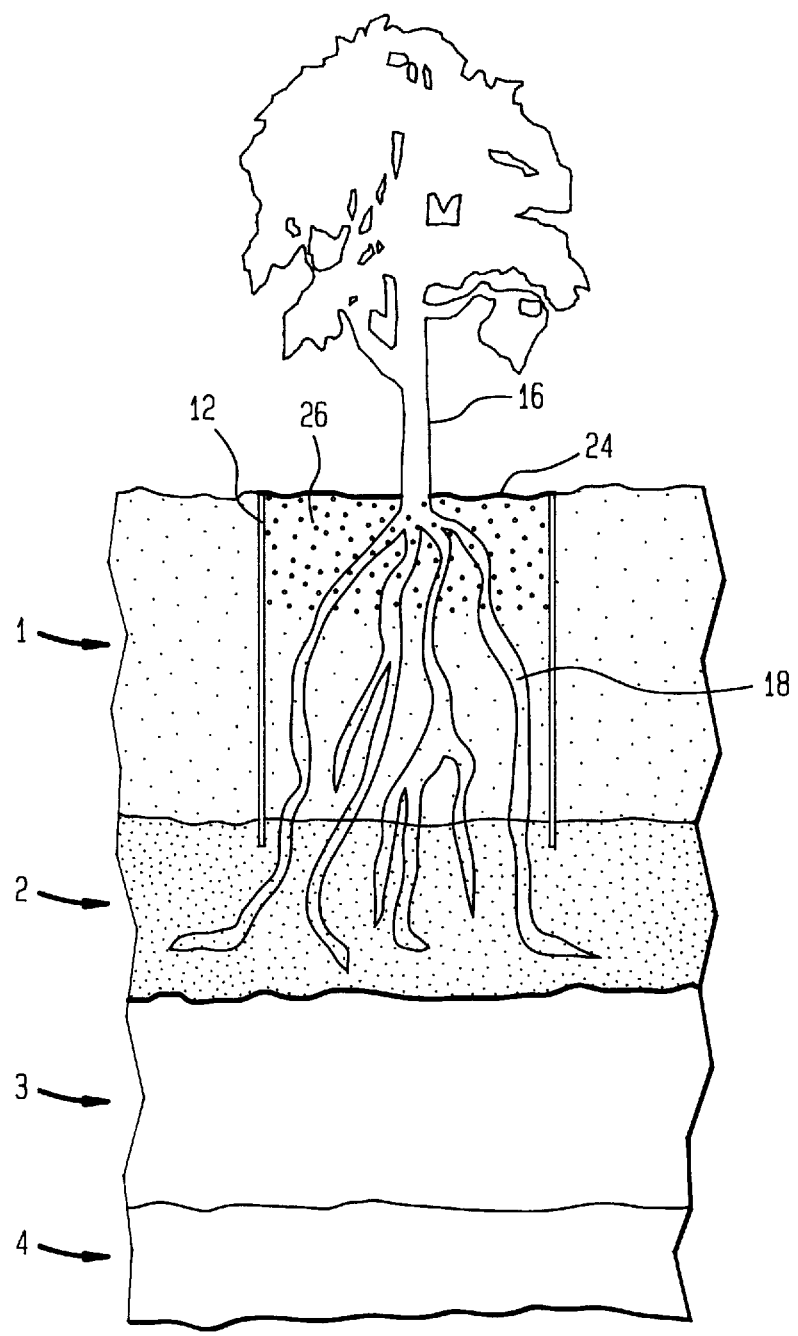
FIG. 7 is a schematic representation of a cross-section of earth in which the root system of a tree is directed downward through the use of a hole lined with a flexible, self-sealing casing.

It should be recognized that the method of using flexible casing 12 can be employed beneficially to line holes which are not prepared to target a contaminated aquifer layer. In FIG. 7, the filled and lined hole, which can be filled and lined in the same way as discussed above, are at the capillary fringe layer 2. The flexible casing 12 limits the root growth of the roots 18 laterally since it is difficult for roots to pierce the flexible casing 12. The root growth is thus directed downward, and the sealing of the flexible casing 12 against the outside soil prevents surface water from finding a vertical pathway along the hole and casing to the bottom of the lined hole. Thus, the roots 18 at the bottom of the root system will be forced to develop in the area of interest. The limitation of water and nutrients within the lined and filled hole will encourage downward growth and development of the root systems which helps extract water, nutrients and accompanying contaminants from the deeper levels. A strong lower root system will help continued downward growth and will also help prevent the roots from breaking through the plastic laterally since the system is encouraged to grow downward to seek out water and nutrients.

FIG. 7 also illustrates the use of a top liner 24 which substantially covers the lined and filled hole up to or close to (only a couple of inches) the trunk of the tree 16. The top liner 24 may be of any suitable material, but is preferably the same material as the flexible casing 12. (It may even be integral with the flexible casing 12; i.e., it may be the same piece of material.) The purpose of the top liner 24 is to substantially prevent surface water from making its way into the lined and filled hole. Of course, any surface water getting into the lined and filled hole will discourage the deep growth of the roots 18 since the roots could otherwise simply feed on the surface water as it percolates downward.

FIG. 7 further shows the use of pea gravel 26 near the surface of the lined and filled hole. This pea gravel, or any other suitable fill material, is used instead of a rooting medium so that the roots are encouraged to obtain nutrients and water below the surface of the pea gravel 26 (i.e., in the rooting medium). As indicated above, gravel or stones or any other suitable fill material might also be provided at the bottom of a hole. In either case, the fill material should be a porous material such that root rot or other problems are avoided.

Figure 8:
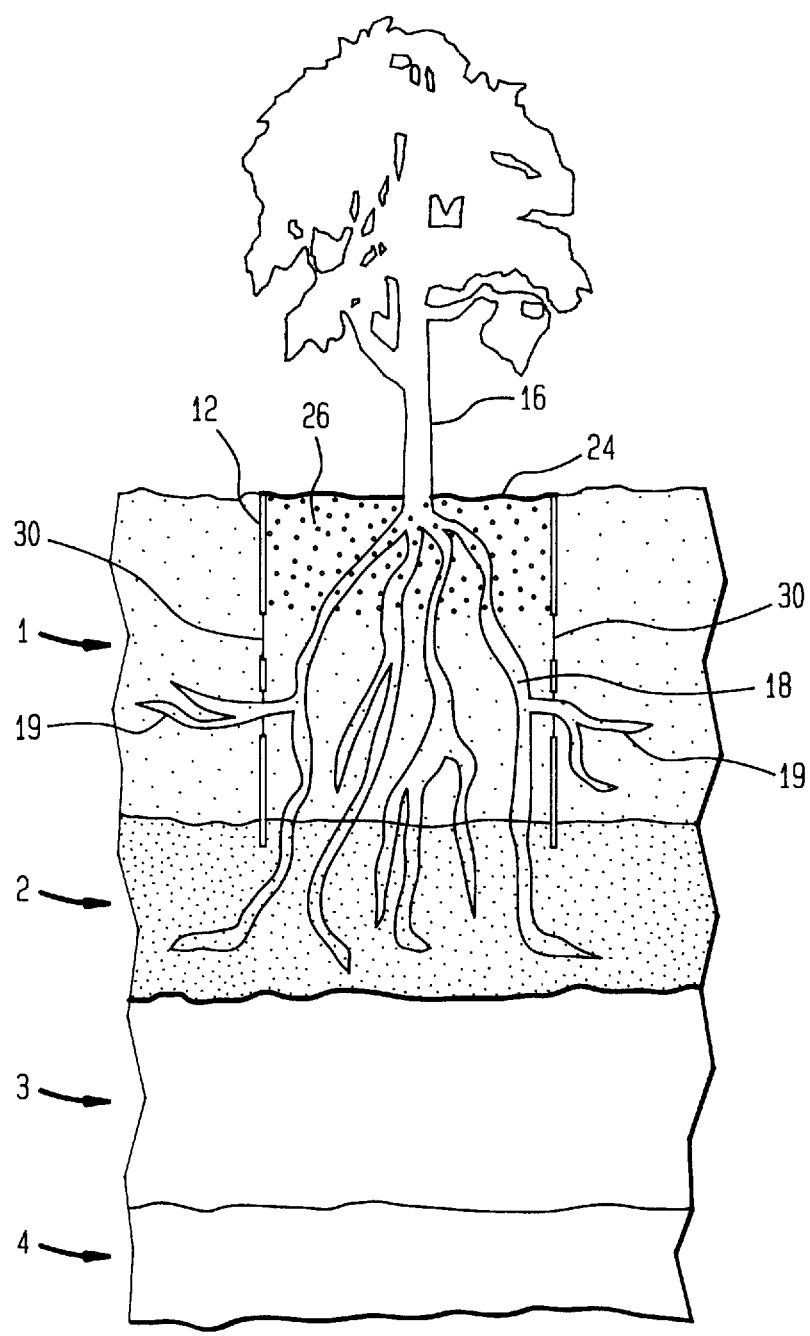
FIG. 8 is a schematic representation of a cross-section of earth in which the root system of a tree is directed downward and also the allowance for horizontal growth at substantially more shallow levels through the use of a hole lined with a flexible, self-sealing casing having openings, some covered with a temporary material, to allow initial root growth development downward and later at different, more shallow levels.

FIG. 8 is a schematic representation of a cross-section of earth having a tree planted within a lined hole, illustrating in particular openings in the liner to permit specific lateral growth.

FIG. 8 illustrates a specialized situation in which a tree 16 is planted within a hole lined with a flexible casing 12 down to a contaminated aquifer layer. (While a flexible casing 12 is illustrated, a hard casing 10 could also be employed in this specialized situation.) The flexible casing 12 includes lateral openings in the vadose zone layer 1. It is through these openings that roots 18 are permitted to grow laterally. The openings may simply be openings with nothing more, or may be openings having a temporary material, designated as 30 in FIG. 8, which will be broken by the roots 18 for the specific and targeted lateral growth. Of course, depending on the temporary material and the structure of the material and opening, the time at which the roots would penetrate the same could vary. Examples of temporary materials include cardboard, burlap, a thin-grade plastic, and the like. FIG. 8 shows roots 19 which have either broken through a temporary material or grown through openings which had no temporary material.

The purpose of such a specialized casing is to permit multiple zone treatment of contaminants. In this case, the lower aquifer level 4 contains contaminants which are being targeted by the casing. The soil in the vadose zone layer is also being targeted, and thus the openings permit treatment at both targeted areas. Another reason for such a specialized casing might be for the health, strength and/or stability of a tree. It may be necessary to maintain the health of a tree over time to provide such a specialized casing.

It is noted that the use of a temporary material through which the roots 18 will grow for the targeted lateral growth can be such that the water and nutrients will be substantially prevented from entering the casing for a period of time. Naturally, it would take some time for the roots 18 to seek out and break through such material. On the other hand, nutrients in the area of the openings could be provided to encourage penetration more quickly. Of course, there may be many openings about the perimeter of the casing and at many different levels, depending upon the purpose for the openings and the zones to be targeted.

While the foregoing description of figures illustrates preferred embodiments of the various techniques in accordance with the present invention, it should be appreciated that the invention also covers various permutations of the foregoing described features, and that certain modifications may be made in the foregoing without departing from the spirit and scope of the present invention which is defined by the claims set forth immediately hereafter.

What is claimed is:

1. A method of planting a tree to facilitate remediation of a contaminated aquifer layer, comprising the steps of:

(a) creating a hole in the earth such that the hole at least reaches the contaminated aquifer layer to be remediated;

(b) at least partially filling the hole with a rooting medium;

(c) preparing the hole to influence the downward growth of the root system of a tree planted therein by providing a casing made of material which is impervious to water and nutrients for root growth, and lining the walls of the hole with such casing so that the roots of the tree extract contaminants from the contaminated aquifer layer;

(d) providing a tree; and (e) planting the tree by placing the root system of the tree at least partially in the rooting medium, whereby the structure of the prepared hole influences the root system of the tree to grow downward towards the contaminated aquifer layer, and the roots extract contaminants from the contaminated aquifer layer.

2. The method in claim 1, wherein the step of providing a casing includes the step of providing a rigid casing for lining the walls of the hole.

3. The method in claim 2, including the steps of providing a flexible self-sealing casing, and lining the rigid casing with the flexible casing.

4. The method in claim 3, wherein the step of providing a flexible self-sealing casing comprises the step of providing a flexible plastic tubing having a thickness in the range from 3 mils to 10 mils.

5. The method in claim 3, including the step of removing the rigid casing from the earth prior to the step of at least partially filling the hole, whereby the flexible casing remains to line the hole and to substantially seal the junction between the flexible casing and the soil outside of the hole.

6. The method in claim 5, including the step of providing an additive on at least portions of the walls of the hole to facilitate the creation of a seal between the flexible casing and the soil outside of the hole.

7. The method in claim 5, further including the step of covering the surface of the earth at the top of the hole in order to prevent surface water from entering the hole.

8. The method in claim 5, including the step of at least partially filling the hole with stones in addition to the rooting medium.

9. The method in claim 1, wherein the step of providing a casing consists of the step of providing a flexible casing which is made of a material which is impervious to water and nutrients for root growth and is pliable such that the junction between the casing and the soil outside of the hole is sealed after the step of at least partially filling the hole.

10. The method in claim 9, including the step of providing an additive in at least portions of the walls of the hole to facilitate the creation of a seal between the flexible casing and the soil outside of the hole.

11. A method of planting a tree to facilitate remediation of contaminated soil and/or groundwater, comprising the steps of:

(a) creating a hole in the earth such that the hole at least reaches the contaminated soil and/or groundwater to be remediated;

(b) lining the walls of the hole with a flexible self-sealing casing made of a material which is impervious to water and nutrients for root growth, such that the root growth of the tree is directed downward;

(c) at least partially filling the lined hole with a rooting medium, whereby the self-sealing casing lining the walls of the hole seals the junction between the walls of the hole and the self-sealing casing;

(d) providing a tree; and (e) planting the tree by placing the root system of the tree at least partially in the rooting medium.

12. The method in claim 11, further including the step of placing a rigid casing in the hole to line the hole prior to or simultaneously with lining the hole with the flexible self-sealing casing.

13. The method in claim 12, further including the step of removing the rigid casing and leaving the flexible self-sealing casing to line the hole.

14. The method in claim 13, wherein the step of providing the flexible casing consists of the step of providing a flexible plastic tubing having a thickness in a range from 3 mils to 10 mils.

15. The method in claim 13, including the step of providing an additive on at least portions of the walls of the hole to facilitate the creation of a seal between the flexible casing and the soil outside of the hole.

16. The method in claim 13, further including the step of covering the surface of the earth at the top of the hole in order to prevent surface water from entering the hole.

17. The method in claim 13, including the step of at least partially filling the hole with stones in addition to the rooting medium.

18. The method in claim 11, further including the step of covering the surface of the earth at the top of the hole in order to prevent surface water from entering the hole.

19. The method in claim 11, including the step of at least partially filling the hole with stones in addition to the rooting medium.

20. A method of planting a tree to facilitate remediation of contaminated soil and/or groundwater, comprising the steps of:

(a) creating a hole in the earth such that the hole at least reaches the contaminated soil and/or groundwater to be remediated;

(b) lining the walls of the hole with a casing made of a material which is impervious to water and nutrients for root growth, the casing having a first end, a second end and at least one opening in between the first end and the second end, whereby the root growth of the tree is directed downward, except that root growth is also permitted through the at least one opening in the casing;

(c) at least partially filling the lined hole with a rooting medium;

(d) providing a tree; and (e) planting the tree by placing the root system of the tree at least partially in the rooting medium.

21. The method in claim 20, wherein the opening in the casing is covered with a material which will temporarily prevent root growth through the opening, and then allow root growth therethrough.

22. The method in claim 20, wherein the casing is a flexible, self-sealing casing.

23. The method in claim 20, wherein the casing is a hard casing.

* * * * *